(12) United States Patent
Hsu et al.

(10) Patent No.: US 10,417,332 B2
(45) Date of Patent: Sep. 17, 2019

(54) PREDICTING TEXT BY COMBINING ATTEMPTS

(71) Applicant: Microsoft Technology Licensing, LLC, Redmond, WA (US)

(72) Inventors: Bo-June Paul Hsu, Woodinville, WA (US); Richard David Tunnicliffe, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 15/380,645

(22) Filed: Dec. 15, 2016

(65) Prior Publication Data

US 2018/0173691 A1    Jun. 21, 2018

(51) Int. Cl.
  G06F 17/27      (2006.01)
  G06F 3/0488     (2013.01)
  G06F 17/24      (2006.01)
  G06F 3/0481     (2013.01)

(52) U.S. Cl.
  CPC .......... *G06F 17/276* (2013.01); *G06F 3/0481* (2013.01); *G06F 3/04886* (2013.01); *G06F 17/24* (2013.01); *G06F 17/273* (2013.01)

(58) Field of Classification Search
  None
  See application file for complete search history.

(56) References Cited

U.S. PATENT DOCUMENTS

| | | | |
|---|---|---|---|
| 5,761,689 A * | 6/1998 | Rayson | G06F 17/273 715/210 |
| 6,377,965 B1 | 4/2002 | Hachamovitch et al. | |
| 8,332,748 B1 | 12/2012 | Karam | |
| 8,782,556 B2 * | 7/2014 | Badger | G06F 3/0237 715/816 |
| 9,122,376 B1 | 9/2015 | Brotherston et al. | |
| 2007/0100635 A1 | 5/2007 | Mahajan et al. | |
| 2007/0239434 A1 * | 10/2007 | Rubanovich | G06F 17/276 704/9 |
| 2008/0126075 A1 | 5/2008 | Thorn | |

(Continued)

FOREIGN PATENT DOCUMENTS

WO    2016059418 A1    4/2016

OTHER PUBLICATIONS

Gong, et al., "Improved Word List Ordering for Text Entry on Ambiguous Keypads", In Proceedings of the 5th Nordic conference on Human-computer interaction: building bridges, Oct. 20, 2008, 23 pages.

(Continued)

*Primary Examiner* — Satwant K Singh
(74) *Attorney, Agent, or Firm* — Schwegman Lundberg & Woessner, P.A.

(57) ABSTRACT

The description relates to predicting text based on multiple user attempts at inputting text. One example can include a computing device comprising a user interface. In this example, the user interface is configured to receive evidence from a first user attempt at inputting text and configured to receive evidence from a second user attempt at inputting the text. The computing device also includes a text prediction engine configured to combine the evidence from the first user attempt at inputting the text and the evidence from the second user attempt at inputting the text to predict the text.

20 Claims, 10 Drawing Sheets

(56) References Cited

U.S. PATENT DOCUMENTS

| | | | |
|---|---|---|---|
| 2008/0195388 A1 | 8/2008 | Bower et al. | |
| 2008/0195571 A1 | 8/2008 | Furuuchi et al. | |
| 2008/0282154 A1* | 11/2008 | Nurmi | G06F 3/0237 715/261 |
| 2009/0327880 A1* | 12/2009 | Ide | G06F 17/2735 715/261 |
| 2011/0154193 A1* | 6/2011 | Creutz | G06F 17/276 715/261 |
| 2013/0187857 A1 | 7/2013 | Griffin et al. | |
| 2013/0246329 A1 | 9/2013 | Pasquero et al. | |
| 2013/0314352 A1 | 11/2013 | Zhai et al. | |
| 2013/0332822 A1* | 12/2013 | Willmore | G06F 17/2775 715/257 |
| 2014/0310213 A1* | 10/2014 | Badger | G06F 3/0237 706/12 |
| 2015/0293602 A1* | 10/2015 | Kay | G06F 3/04883 345/168 |
| 2016/0103812 A1 | 4/2016 | Badger et al. | |
| 2016/0132119 A1* | 5/2016 | Temple | G06F 3/017 345/168 |
| 2016/0232147 A1* | 8/2016 | Pereira | G06F 3/04886 |
| 2016/0275070 A1 | 9/2016 | Corston et al. | |
| 2017/0168711 A1* | 6/2017 | Temple | G06F 3/0233 |
| 2018/0173691 A1* | 6/2018 | Hsu | G06F 17/276 |
| 2018/0300021 A1* | 10/2018 | Montaldi | G06F 3/0482 |
| 2018/0314343 A1* | 11/2018 | Montaldi | G06F 3/0237 |

OTHER PUBLICATIONS

Joe, "Swype vs Swiftkey vs Fleksy: Android —Best Keyboard App?", http://joyofandroid.com/swype-vs-swiftkey-vs-fleksy-android-app/, Published on: Oct. 11, 2014, 35 pages.

Agarwal, et al., "Context Based Word Prediction for Texting Language", In Proceedings of Large Scale Semantic Access to Content (Text, Image, Video, and Sound), May 30, 2007, 9 pages.

Henry, Alan, "How Predictive Keyboards Work (and How You Can Train Yours Better)", http://lifehacker.com/how-predictive-keyboards-work-and-how-you-can-train-yo-1643795640, Published on: Aug. 10, 2014, 14 pages.

Kukich, Karen, "Techniques for Automatically Correcting Words in Text", In Journal of ACM Computing Surveys, vol. 24, Issue 4, Dec. 1992, 63 Pages.

"International Search Report and Written Opinion Issued in PCT Application No. PCT/US2017/065218", dated Mar. 29, 2018, 12 Pages.

* cited by examiner

PREDICTING TEXT BY COMBINING ATTEMPTS

BACKGROUND

Most modern text input applications include predictive text and auto-correct functions to help the user efficiently and accurately input text into a document or message. These functions require a text prediction engine to generate candidates of what the user is likely to be intending or to have intended to type. The highest ranking candidates, for example with the highest probability of being what the user intended, can be displayed to the user for user selection in predictive text. Additionally or alternatively, the highest ranking candidates can be automatically inserted in response to a spacebar or other predetermined input in auto-correct functionality.

Sometimes text prediction engines does not accurately predict what the user intended to type. In this case, unwanted candidates may be displayed for user selection in predictive text or an unwanted correction may be made automatically. When this happens the user has to go back and manually edit the incorrect text. In the extreme case, the user might have to delete the entire composing text and start again from scratch, entering each character one by one.

With these disadvantages in mind, it can be appreciated that there is a need to improve the user experience when the text prediction engine has not provided helpful candidates after a first user attempt.

The embodiments described below are not limited to implementations which solve any or all of the disadvantages of known techniques.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

The description relates to predicting text based on multiple user attempts at inputting text. One example can include a computing device comprising a user interface. In this example, the user interface is configured to receive evidence from a first user attempt at inputting text and configured to receive evidence from a second user attempt at inputting the text. The computing device also includes a text prediction engine configured to combine the evidence from the first user attempt at inputting the text and the evidence from the second user attempt at inputting the text to predict the text.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts or steps in the accompanying drawings.

DETAILED DESCRIPTION

The present disclosure presents a computing device comprising a text prediction engine for supporting predictive text and auto-correct functions. The text prediction engine enables better candidates to be generated when a user makes a second attempt at inputting text. This makes it easier for the user to rectify an incorrect auto-correction and to rectify composing text when unsuitable predictive text candidates have been presented. Candidates may comprise a string of characters such as a word, a series of words, a series of characters such as letters that do not comprise a word, or even a single character.

Figure 1:
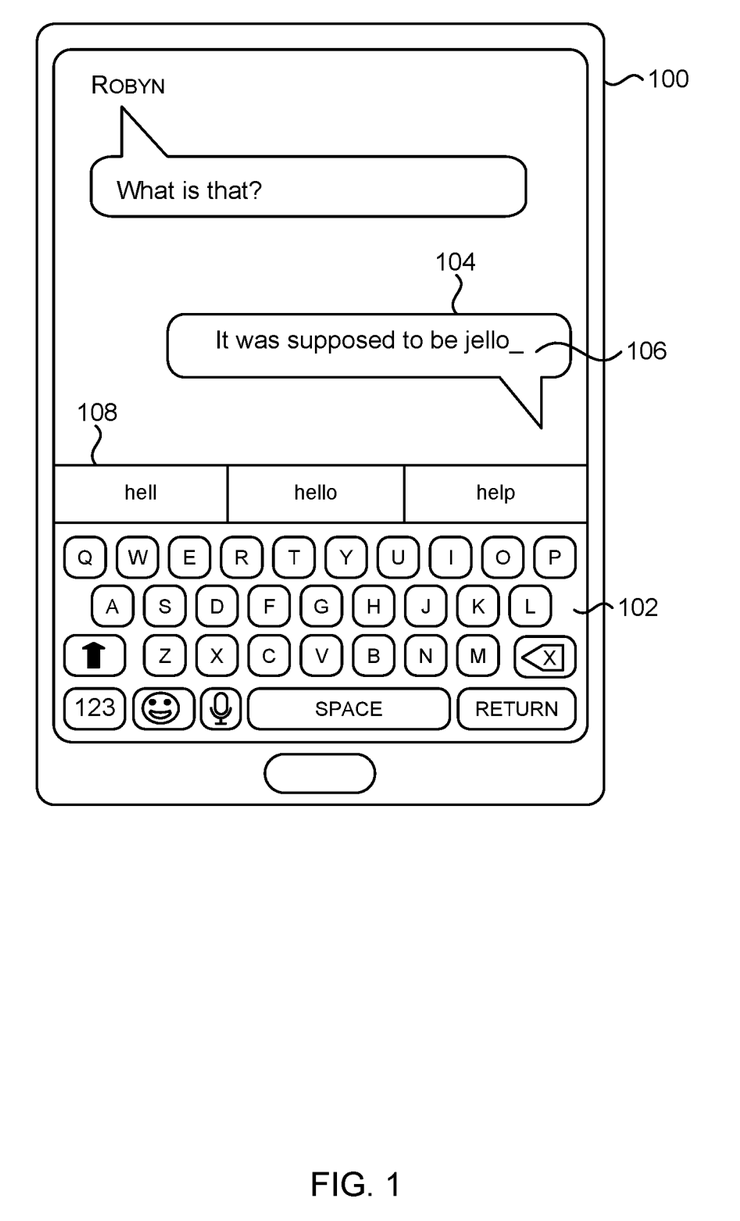
FIG. 1 is a schematic diagram of a mobile device presenting predicted text to a user based on a first user attempt at inputting text.

Referring to FIG. 1, a computing device 100 such as a mobile device enables a user to input text using a keyboard 102 displayed on a touchscreen. In the example shown, the user is typing a text message 104 in a chat or conversation, but in other examples the user may be inputting text into a document or other suitable file. It can be seen that as the user inputs text, for example by tap input, a cursor 106 indicates where the user has got to in the current word. In in this example the current word typed so far is "jello".

The computing device 100 has a text prediction engine for assisting the user to efficiently and accurately input text. The text prediction engine generates candidates that are likely to be what the user is intending to type, and provides a plurality of the top ranking candidates to be displayed to the user for user selection. In the example of FIG. 1, a candidate bar 108 is displayed that presents the three top ranking candidates, "hello", "hell" and "help". In this example, the top ranking candidate, "hello", is displayed centrally for ease of user selection by tapping, and the second ranking candidate, "hell", is presented on the left and the third ranking candidate, "help", is presented on the right.

It will be appreciated that the text prediction engine uses the word typed so far, also referred to as the composing text, as an input for calculating and ranking the suggested candidates. However, other factors may also be used as inputs to the calculation, such as the context of the composing text. In the example of FIG. 1, the context may include the rest of the text message 104 so far, i.e. the phrase "It was supposed to be", and may additionally include the content of previous messages in the conversation, such as "What is that?" Other context such as words that the user inputs frequently may also be used to calculate the candidates.

The computing device 100 is configured such that if the user selects one of the suggested candidates by tapping it in the candidate bar 108, the selected word will be inserted into the text message 104 in place of the composing text "jello". Alternatively, if the user taps the space bar or another predetermined character of the keyboard such as a predetermined punctuation key, the composing text "jello" will be automatically corrected to the top ranking candidate, "hello".

Figure 2:
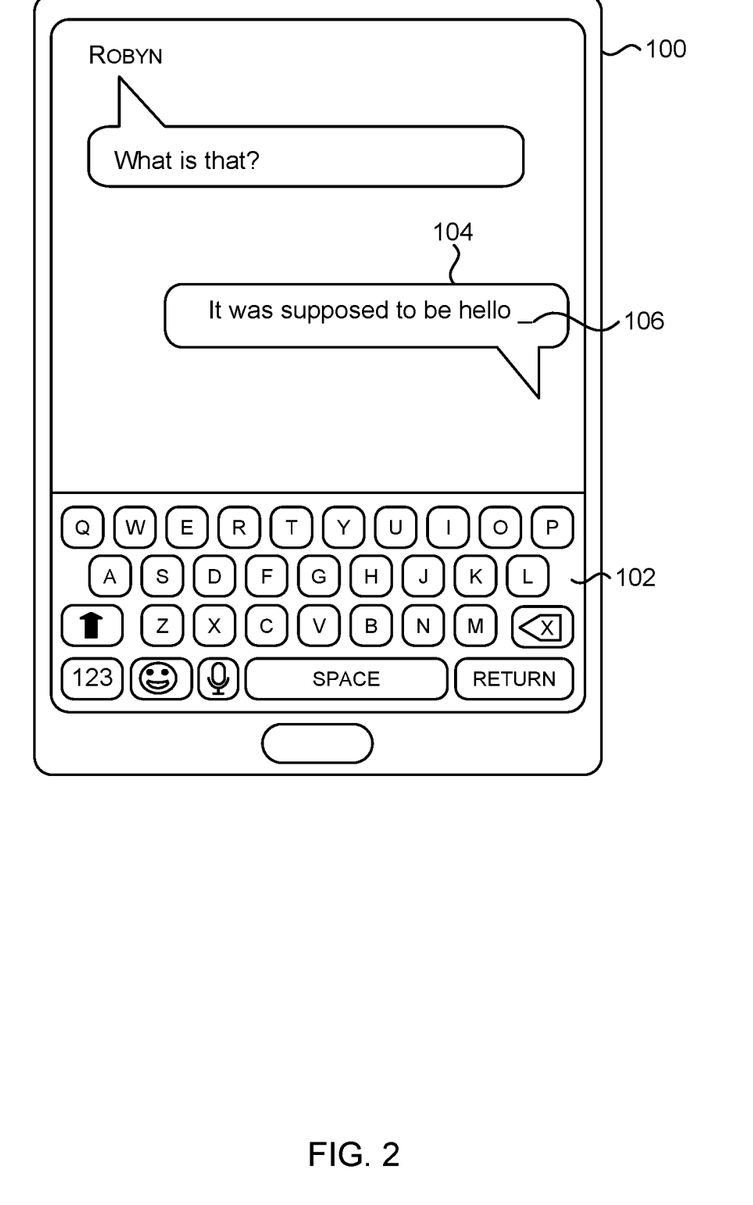
FIG. 2 is a schematic diagram of the mobile device of FIG. 1 presenting automatically corrected text to the user after the first user attempt.

This auto-correct scenario is shown in FIG. 2, in which the composing text "jello" has been replaced by "hello", and the cursor 106 is separated from the inserted word "hello" by a space.

It is possible that the autocorrected text is what the user had intended to type, in which case the user can continue to type and has been helped by the auto-correct function which predicted correctly what the user had intended to type.

Figure 3:
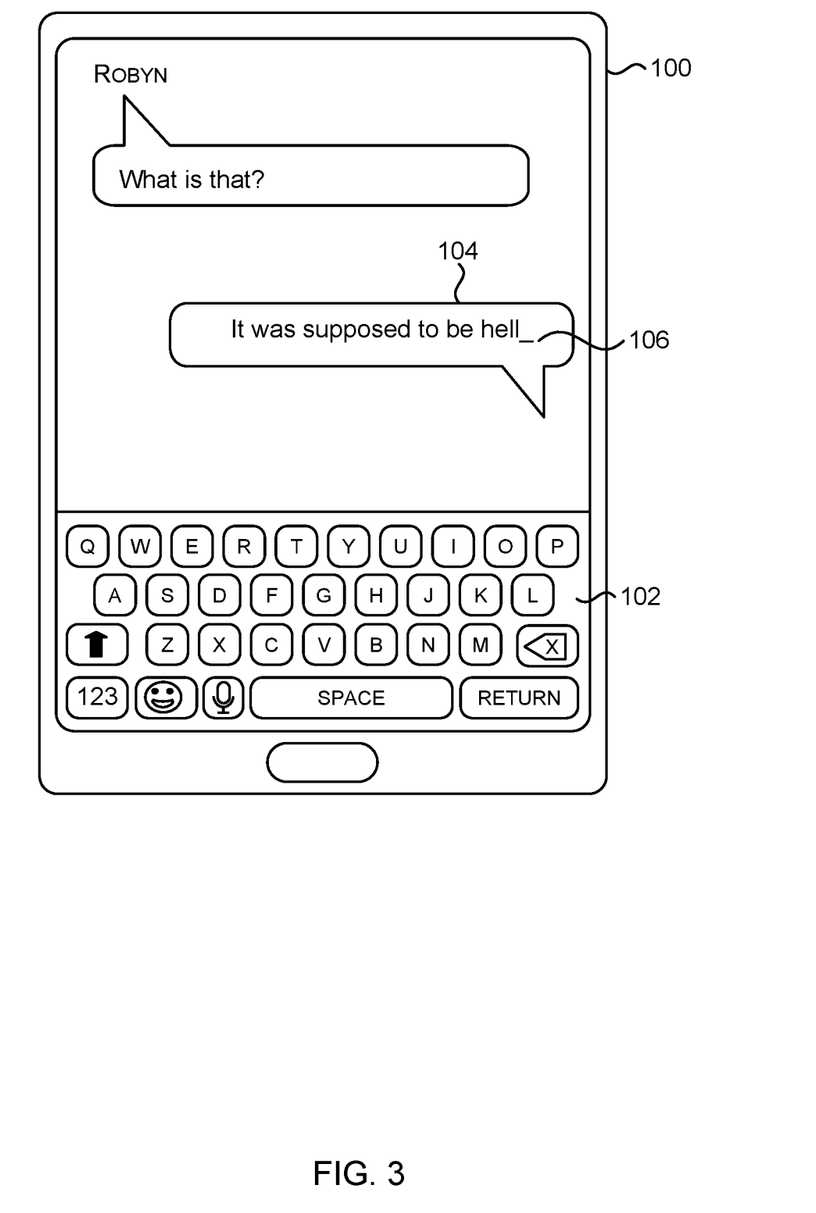
FIG. 3 is a schematic diagram of the mobile device of FIG. 1 when the user is deleting the automatically corrected text.

However, if the autocorrected text is not what the user had intended to type, the user has to go back and delete at least part of the autocorrected text and re-enter the characters that were intended one by one. The process of deleting the autocorrected text is shown in FIG. 3, where the user has deleted the space and the letter "o", and the cursor is now positioned immediately after the second "l", ready for the user to continue deleting as many characters as necessary.

Figure 4:
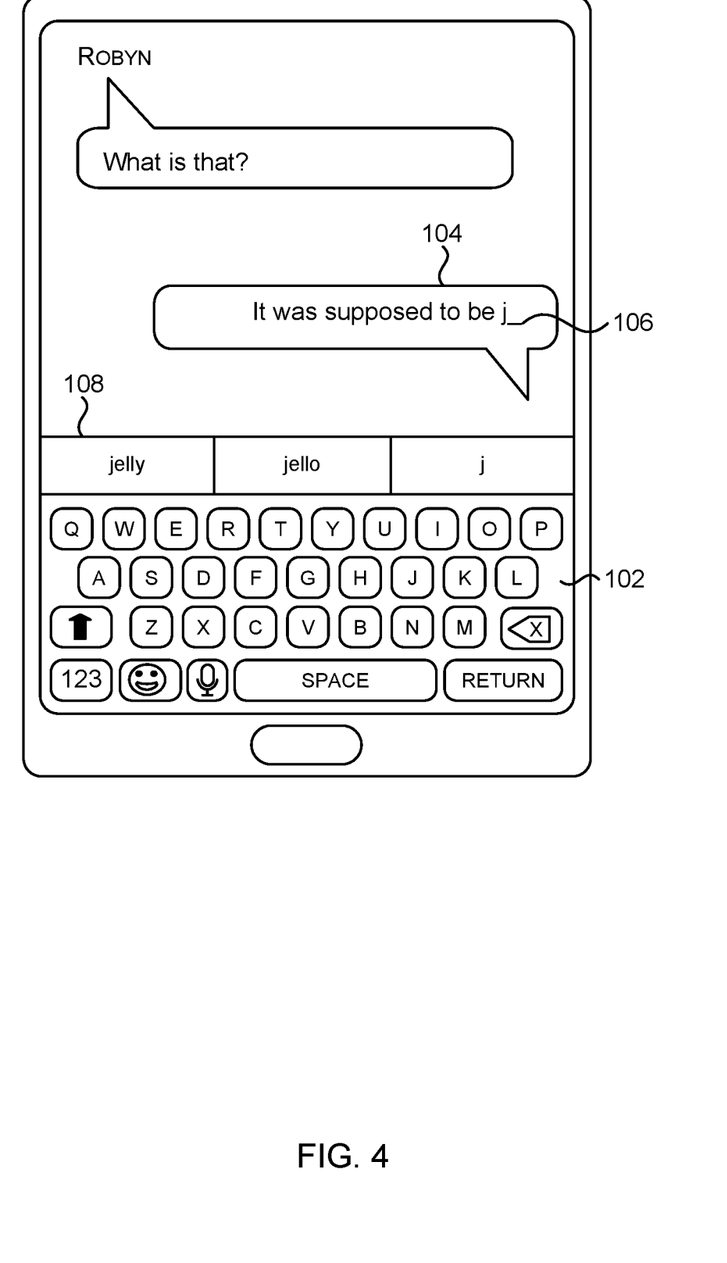
FIG. 4 is a schematic diagram of the mobile device of FIG. 1 during a second user attempt at inputting the text.

In the example of FIG. 4, the user has deleted the whole autocorrected word and has now started typing the intended word again from scratch, starting with the letter "j". The typed letter "j" is the start of the user's second attempt which is ongoing in FIG. 4 in the sense that the user may enter further characters.

During the course of the second user attempt at inputting the text, the computing device 100 is configured to calculate candidates by combining evidence from the first user attempt and evidence from the second user attempt. Using evidence from both attempts improves the quality of candidates that can be calculated during the second user attempt, and helps the user to rectify the incorrect auto-correction.

Accordingly, the present disclosure presents a computing device 100 that comprises a user interface configured to receive evidence from a first user attempt at inputting text and to receive evidence from a second user attempt at inputting the text; and a text prediction engine configured to combine the evidence from the first user attempt at inputting the text and the evidence from the second user attempt at inputting the text to predict the text.

One way of combining the evidence from the two attempts is to generate a second ordered list of candidates using the second user attempt, optionally including other evidence such as the context of the composing text, and to create a second ordered list of candidates. A third ordered list of candidates can then be generated by combining the first and second lists.

A text prediction engine is thus presented that is configured to generate a first ordered list of candidates using the evidence from the first user attempt at inputting the text; generate a second ordered list of candidates using the evidence from the second user attempt at inputting the text; and generate a third ordered list of candidates comprising one or more candidates from the first ordered list of candidates and one or more candidates from the second ordered list of candidates.

Figure 5:
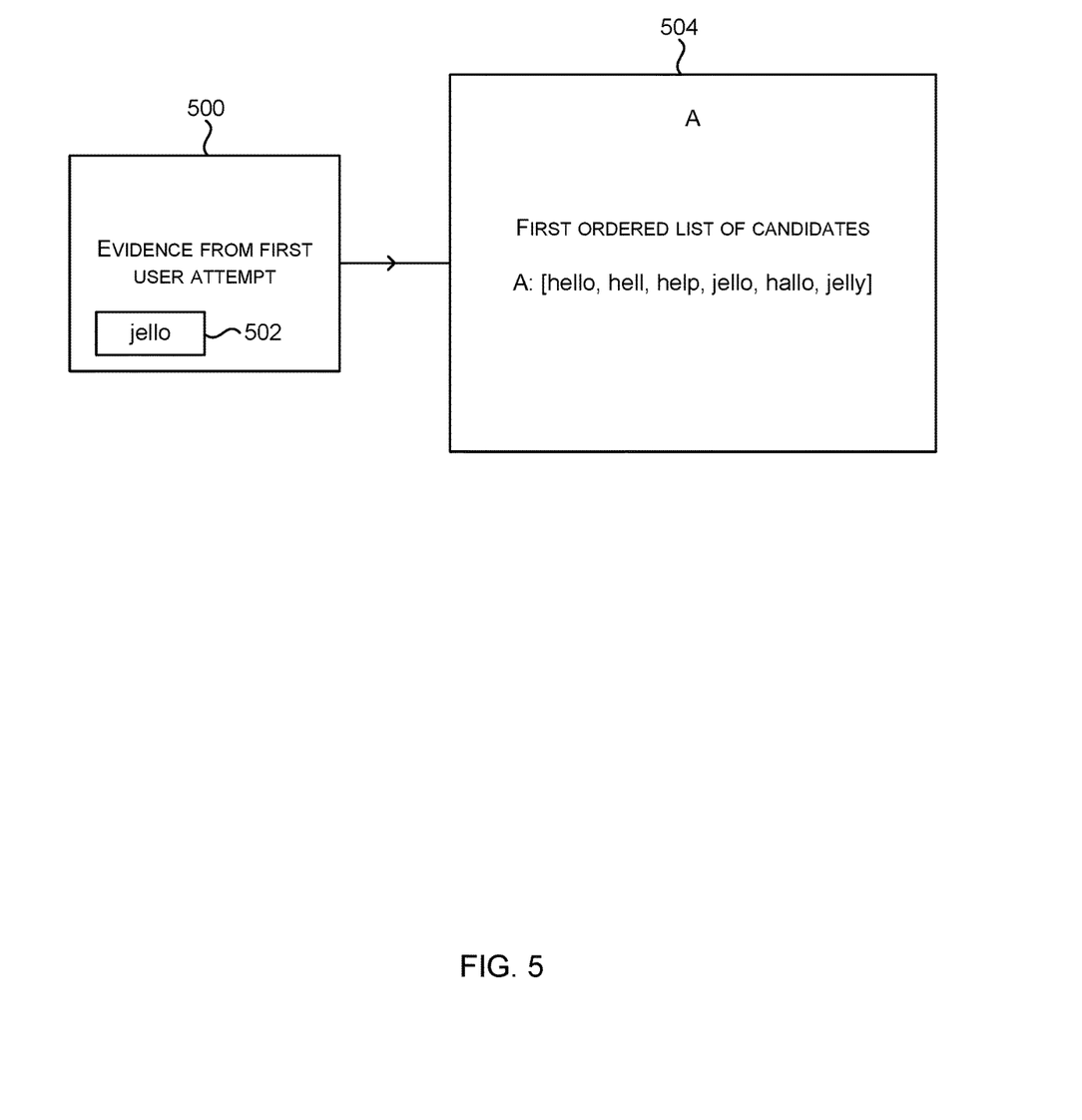
FIG. 5 is a flow chart of a method of predicting text according to the present disclosure.

For example, continuing the earlier example, the computing device 100 may be configured to use evidence 500 from a first user attempt comprising composing text "jello" 502 to generate a first ordered list of candidates, A, 504, as shown in FIG. 5. The first ordered list of candidates, A, 504 may for example comprise six candidates as follows, and as shown in FIG. 5.

A: [hello, hell, help, jello, hallo, jelly]

Figure 6:
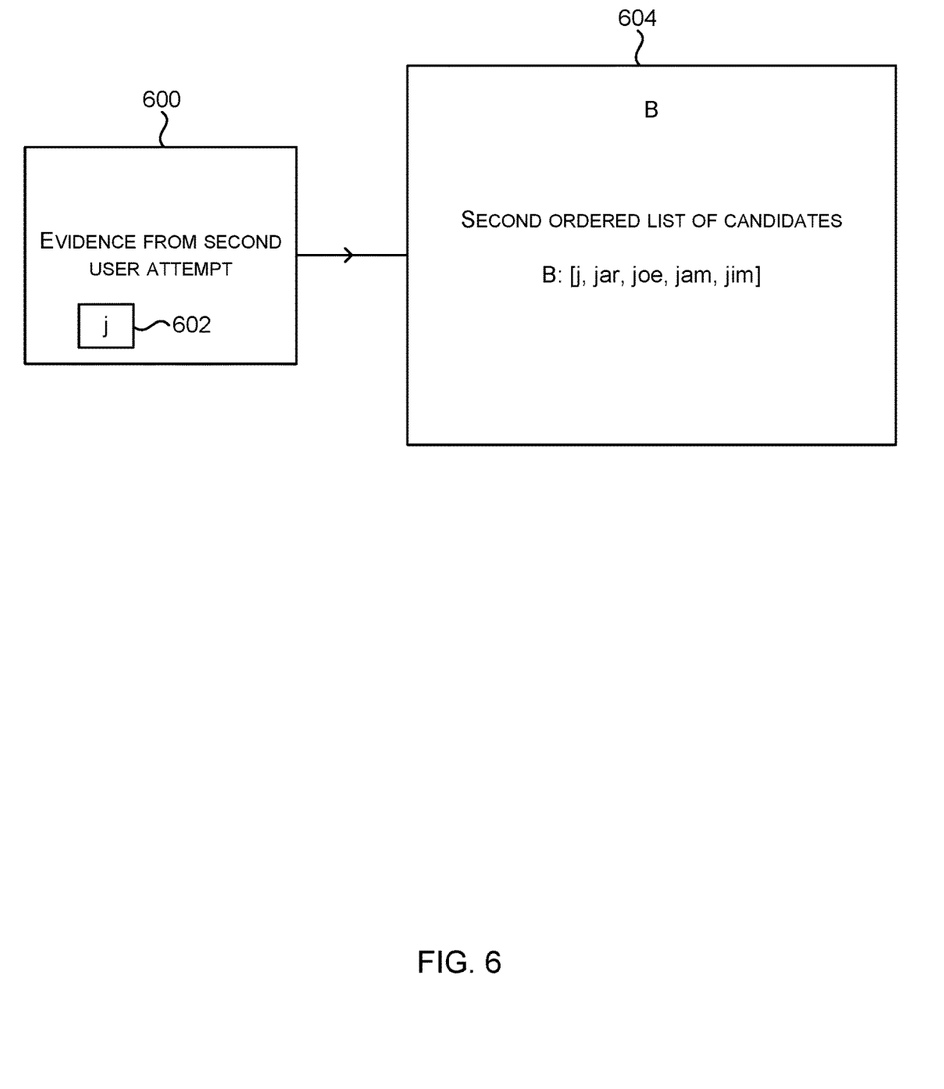
FIG. 6 is a schematic diagram representing generation of a first ordered list of candidates in the above method.

Similarly, with reference to FIG. 6, the computing device 100 may be configured to use evidence 600 from a second user attempt comprising composing text "j" 602 to generate a second ordered list of candidates, B, 604. The second ordered list of candidates, B, 604 may comprise five candidates as follows, and as shown in FIG. 6.

B: [j, jar, joe, jam, jim]

A third ordered list, C, can then be generated using some or all of the candidates in list A and some or all of the candidates in list B.

It is reasonable to assume that the user is taking particular care when inputting composing text for a second time. As a result, it is suitable to assume that the composing text of the second user attempt is more reliable than the composing text of the first attempt. With this in mind, when generating the second ordered list, B, using the evidence from the second user attempt, it is suitable for the computing device 100 to be configured to promote candidates that have an exact match, or whose prefix is an exact match, with the composing text of the second user attempt.

To generate the third ordered list, C, from some or all of the candidates in list A and from some or all of the candidates in list B, it is appropriate for the computing device 100 to be configured to preserve the order within the candidates from list A and to preserve the order within the candidates from list B. However, preserving the order is not essential. For example, if list A contains [x, z] and list B contains [y, z], then list C may start with [z, . . . ] because candidate z appears in both lists A and B so it can be considered that the evidence for candidate z is strongest.

It is also appropriate for the computing device 100 to be configured to remove duplicates—i.e. candidates that might have appeared in both lists A and B, and have both been brought over into the combined list, C.

One way to generate the third ordered list, C, is to promote a subset of candidates that benefit from evidence from both user attempts to the top. This can be achieved by filtering the first ordered list of candidates using the evidence from the second user attempt. For example, the candidates from the first ordered list can be filtered to identify only the candidates that are consistent with the composing text of the second user input. More generally, the first ordered list can be filtered to identify matching candidates, at least part of each of which meets a threshold similarity with the composing text of the second user attempt.

Figure 7:
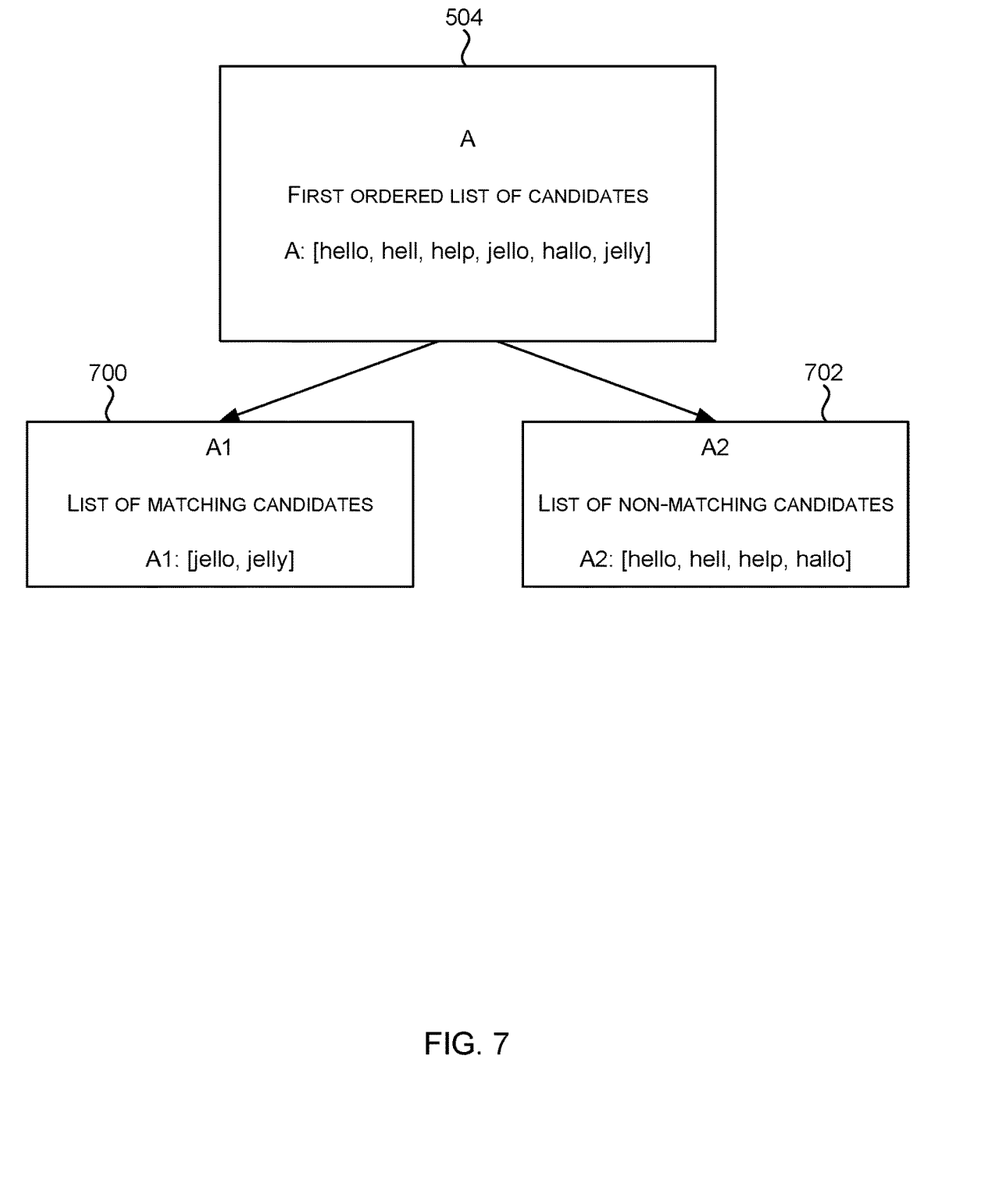
FIG. 7 is a schematic diagram representing generation of a second ordered list of candidates in the above method.

For example, referring to FIG. 7, the first ordered list, A: [hello, hell, help, jello, hallo, jelly], 504 can be filtered to identify only the candidates that are consistent with the composing text "j" 602 of the second user attempt. This produces a filtered list, A1, 700 of matching candidates as follows.

A: [hello, hell, help, jello, hallo, jelly]

A1: [jello, jelly]

The filtered list, A1, 700 benefits from evidence from both the user attempts, and is therefore likely to offer the best candidates available. As a result, it is suitable to promote these matching candidates to the top of the combined list, C.

A combined list, C, could for example comprise the list A1 700 together with the list B 604 such that the candidates of A1 are given a higher ranking than the candidates of B.

C: [jello, jelly, j, jar, joe, jam, jim] (A1+B)

The disclosure accordingly presents a computing device 100 having a text prediction engine that is configured to filter the first ordered list of candidates to identify matching and non-matching candidates of the first ordered, wherein at least part of each matching candidate meets a threshold similarity with the composing text of the second user attempt, and wherein at least part of each non-matching candidate fails to meet the threshold similarity with the composing text of the second user attempt; include the matching candidates in the third ordered list; and rank the matching candidates higher than the one or more candidates from the second ordered list of candidates in the third ordered list. In suitable examples, each matching candidate comprises the composing text of the second user attempt.

The candidates from list A that were not included in A1 may be said to form another list A2. The candidates of A2 may be non-matching in the sense that they are not consistent with the composing text of the second user attempt, or more generally at least part of each of the non-matching candidate fails to meet a threshold similarity with the composing text of the second user attempt.

Continuing the example of FIG. 7, the first ordered list, A: [hello, hell, help, jello, hallo, jelly], 504 can be filtered to identify only the candidates that are not consistent with the composing text "j" 602 of the second user attempt. This produces a filtered list, A2, 702 of non-matching candidates as follows.

A: [hello, hell, help, jello, hallo, jelly]
A2: [hello, hell, help, hallo]

The candidates of A2 can be included in the combined list, but they should be ranked lower than the candidates of list B. This reflects the fact that they are not consistent with the composing text of the second user attempt and that they are less likely to be what the user is intending to type. More generally, this may reflect the fact that at least part of each non-matching candidate fails to meet a threshold similarity with the composing text of the second user attempt.

Figure 8:
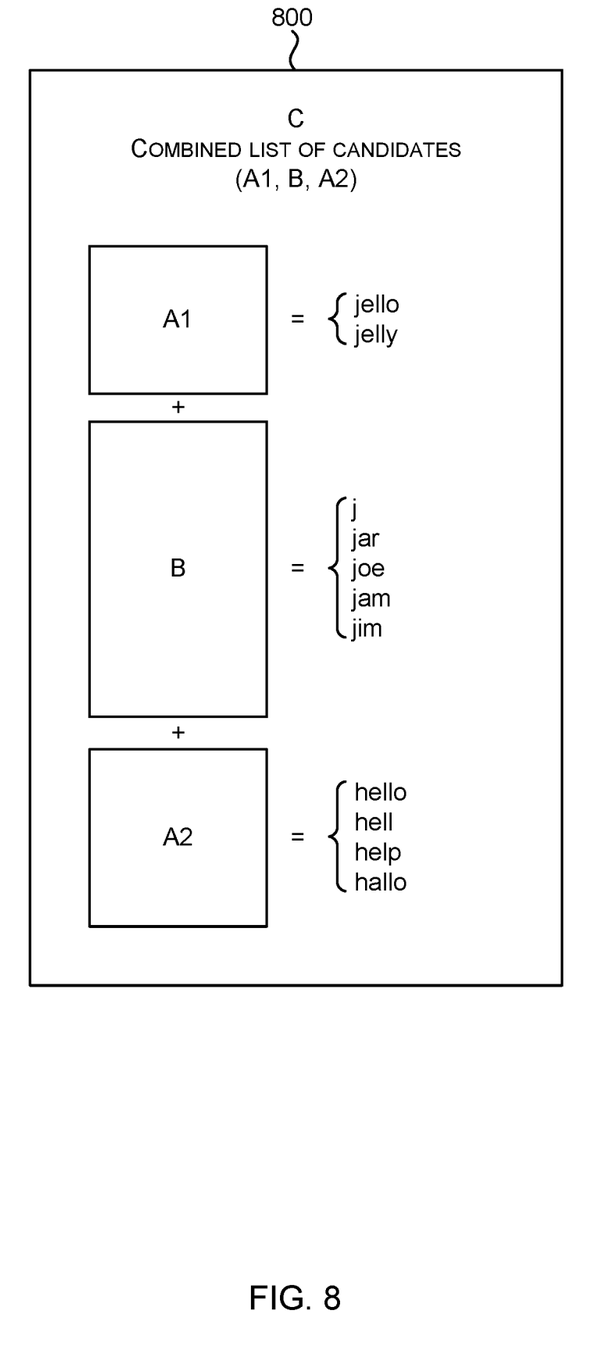
FIG. 8 is a schematic diagram representing filtering of candidates in the above method.

Referring to FIG. 8, if the non-matching candidates of A2 are to be included in the combined list C, the combined list C may be constructed as follows.

C: [jello, jelly, j, jar, joe, jam, jim, hello, hell, help, hallo] (A1+B+A2)

The disclosure accordingly presents a computing device 100 having a text prediction engine configured to include the non-matching candidates in the third ordered list; and rank the non-matching candidates lower than the one or more candidates from the second ordered list of candidates in the third ordered list. In suitable examples, each non-matching candidate does not comprise the composing text of the second user attempt.

Regardless of the details of how the third ordered list of candidates, C, is generated, for example whether or not non-matching candidates are included, the third ordered list is based on evidence from two user attempts. As such, the third ordered list according to embodiments of the disclosure provides improved candidates for functions such as auto-correct and predictive text.

For example, in auto-correct functionality, the computing device 100 may comprise a text prediction engine configured to automatically correct the second user attempt by replacing the composing text of the second user attempt to a highest ranking candidate of the third ordered list. This may suitably be in response to a predetermined user input such as a spacebar user input or one of a plurality of predetermined punctuation user inputs.

In text prediction functionality, the computing device 100 may comprise a text prediction engine configured to display at least one of a plurality of highest ranking candidates of the third ordered list to the user for user selection. For example, the three highest ranking candidates of C: A+B+A2 may be displayed in a candidate bar 108 with the top ranking candidate, "jello", located in a central position of the candidate bar 108, as shown in FIG. 4.

As indicated above, the second user input may be ongoing, such as the second user input shown in FIG. 4 which comprises just the letter "j". In this example, the user has started the second attempt but has only inputted the first letter. It is likely that the user will continue with at least one more letter, and in this sense the second user input is only partially complete and there will be further evidence, in the form of further characters, as it continues. Each time a further character is inputted, this provides further evidence for the second input and the computing device 100 is configured to take this further evidence into account. This may be achieved by the text prediction engine combining the evidence from the first attempt with the updated evidence from the second attempt when predicting text. Accordingly, the disclosure presents a computing device configured to receive further evidence from the second user attempt; and repeat the combining to incorporate the further evidence.

Figure 9:
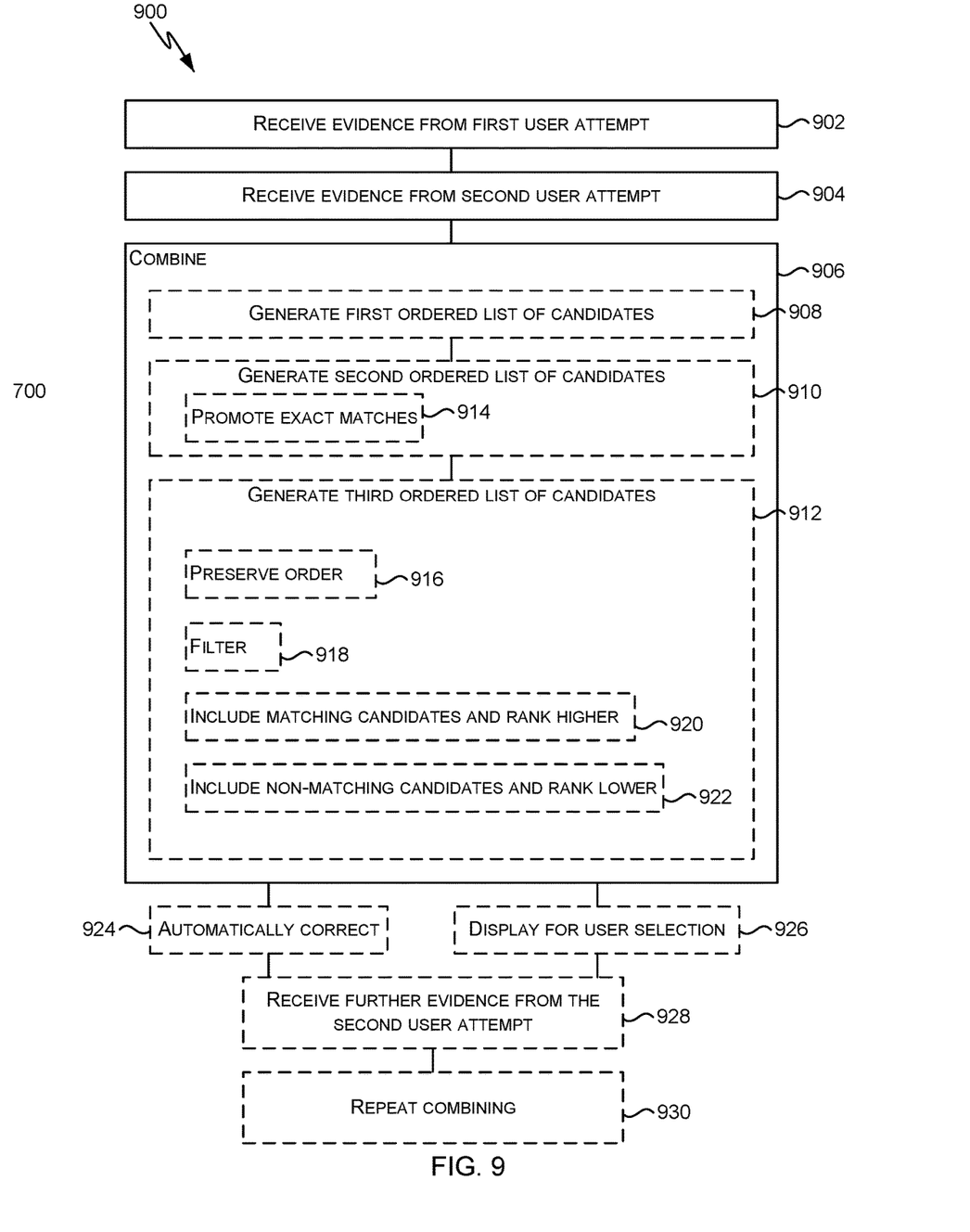
FIG. 9 is a schematic diagram representing generation of a third ordered list of candidates in the above method.

With reference to FIG. 9, the disclosure extends to a method 900 performed by a computing device for predicting text. The method 900 comprises receiving 902 evidence from a first user attempt at inputting text. The first user attempt may comprise inputting text using various modalities, such as tap input using a keyboard displayed on a touchscreen, flow input using a keyboard displayed on a touchscreen, speech recognition, handwriting recognition for example using a stylus on a touchscreen, or any other suitable input modality. The method 900 also comprises receiving 904 evidence from a second user attempt at inputting text. The second user attempt may also suitably comprise inputting text using various modalities, such as tap input using a keyboard displayed on a touchscreen, flow input using a keyboard displayed on a touchscreen, speech recognition, handwriting recognition for example using a stylus on a touchscreen, or any other suitable input modality.

The evidence from the first user attempt and the evidence from the second user attempt are then combined 906 for the purpose of predicting text more effectively based on two user attempts. This may be achieved by generating 908 a first ordered list of candidates using the evidence from the first user attempt at inputting the text, generating 910 a second ordered list of candidates using the evidence from the second user attempt at inputting the text, and generating 912 a third ordered list of candidates comprising one or more candidates from the first ordered list of candidates and one or more candidates from the second ordered list of candidates.

Suitably, the evidence from the second user attempt may comprise composing text of the second user attempt, and the method 900 may include promoting 914 candidates of the first, second, or third ordered list that are an exact match, or that have a prefix that is an exact match, with the composing text of the second user attempt.

The method 900 may alternatively or additionally include preserving 916 the order of the one or more candidates from the first ordered list and preserving the order of the one or more candidates from the second ordered list when generating the third ordered list.

Suitably, the evidence from the second user attempt may comprise composing text of the second user attempt, and generating 912 the third ordered list may comprise filtering 918 the first ordered list of candidates to identify matching and non-matching candidates of the first ordered list of candidates, wherein at least part of each matching candidate meets a threshold similarity with the composing text of the second user attempt, and wherein at least part of each non-matching candidate fails to meet the threshold similarity with the composing text of the second user attempt. In this case, the method 900 may comprise including 920 the matching candidates in the third ordered list and ranking the matching candidates higher than the one or more candidates from the second ordered list of candidates in the third ordered list. The step of generating 912 the third ordered list of candidates may also comprise including 922 the non-matching candidates in the third ordered list and ranking the non-matching candidates lower than the one or more candidates from the second ordered list of candidates in the third ordered list.

The method 900 may suitably comprise automatically correcting 924 the second user attempt by replacing the composing text of the second user attempt with a highest ranking candidate of the third ordered list in response to a spacebar user input or in response to one of a plurality of predetermined punctuation user inputs. Alternatively or additionally, the method 900 may comprise displaying 926 a plurality of highest ranking candidates of the third ordered list for user selection.

Finally, the method 900 may suitably comprise receiving 928 further evidence from the second user attempt and repeating 930 the combining to incorporate the further evidence.

Figure 10:
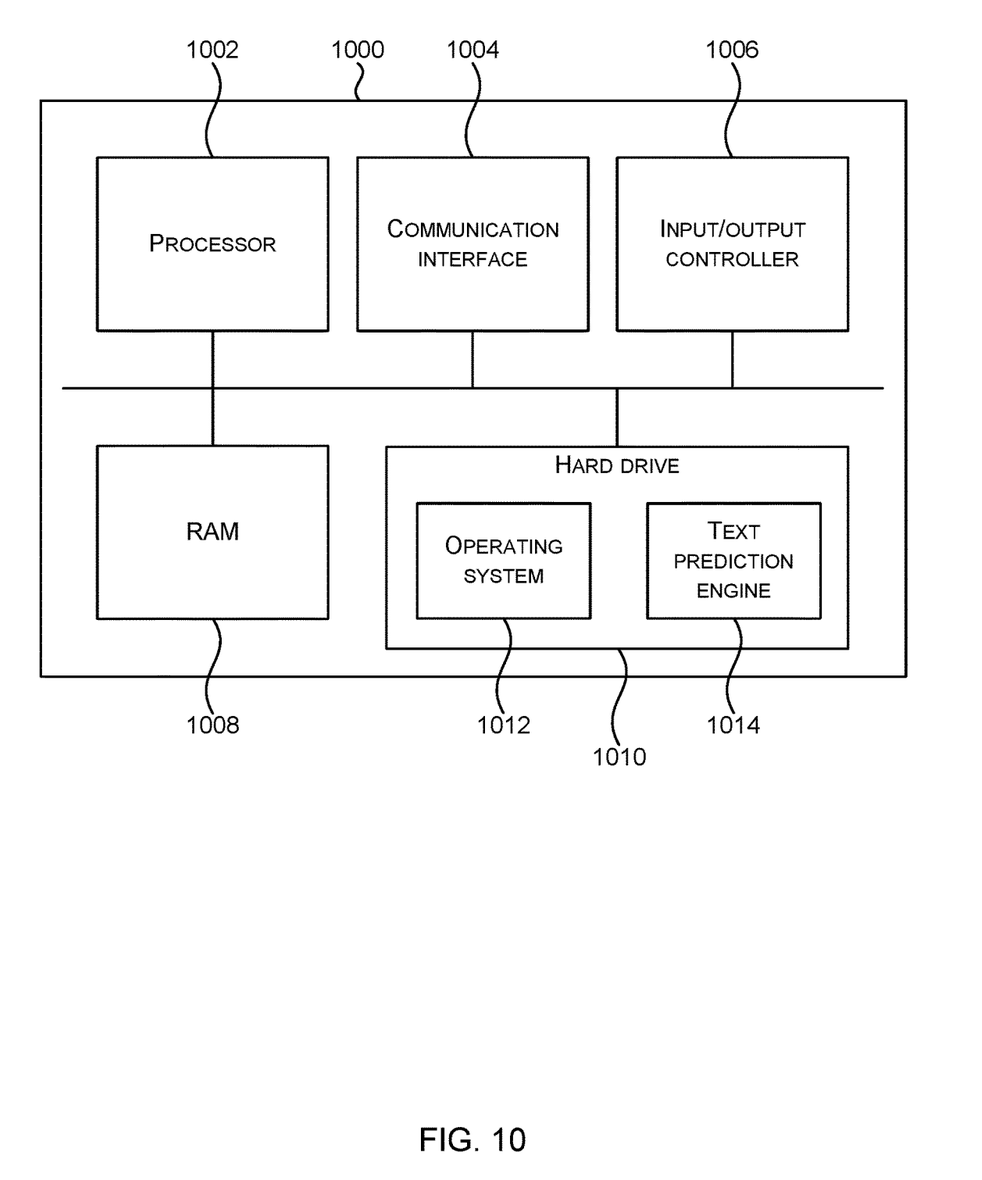
FIG. 10 is a schematic diagram of a computing device suitable for performing the above method.

A computing device 1000 suitable for implementing the method 900 is shown in FIG. 10. The computing device 1000 comprises a processor 1002, a communication interface, an input/output controller 1006, Random Access Memory (RAM) 1008, and a hard drive 1010. The hard drive 1010 comprises an operating system 1012 and a text prediction engine 1014 as described above. The computing device 1000 may be configured to cache the results of the first user attempt, for example the first ordered list of candidates, for use during the second attempt.

Although embodiments have been described in which first and second lists, A and B, are generated, the generation of such intermediate lists is not essential. As such, the invention includes embodiments in which a final ordered list, C, of candidates is generated in the second user attempt by combining the evidence from the first and second user attempts without generating intermediate lists of candidates.

The distinction between matching and non-matching candidates, which may be based on a threshold similarity as described above, is also not essential. For example, there may be a gradation according to which best matching candidates are allocated top ranks, moderately matching candidates are allocated moderately high ranks, poorly matching candidates are allocated moderately low ranks, and very poorly matching candidates are allocated lowest ranks. This gradation could, for example, be implemented using a plurality of threshold similarities to define the different gradations. Alternatively, a continuous scale of similarities and rankings could be used.

The technique disclosed herein could be used for any predictive text engine. In the above description, the techniques are implemented using instructions provided in the form of stored software. Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The methods herein, which involve input text from users in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner.

The invention claimed is:

1. A computing device comprising a processor and memory, the memory storing computer-executable instructions that, when executed by the processor, cause the computing device to perform operations comprising:
   receive data indicative of a first user attempt at inputting text;
   provide an autocorrect to the first user attempt;
   receive a user input deleting at least one character of the autocorrect;
   receive data indicative of a second user attempt at inputting the text, wherein the second user attempt occurs after receiving the user input deleting the at least one character;
   combine the data indicative of the first user attempt at inputting the text and the data indicative of the second user attempt at inputting the text to predict the text; and
   output the prediction for display.

2. The computing device of claim 1, further comprising computer-executable instructions that, when executed by the processor, cause the computing device to perform operations comprising:
   generate a first ordered list of candidates using the data indicative of the first user attempt at inputting the text;
   generate a second ordered list of candidates using the data indicative of the second user attempt at inputting the text; and
   generate a third ordered list of candidates comprising one or more candidates from the first ordered list of candidates and one or more candidates from the second ordered list of candidates.

3. The computing device of claim 2, wherein:
   the data indicative of the second user attempt comprises composing text of the second user attempt; and
   further comprising computer-executable instructions that, when executed by the processor, cause the computing device to perform operations comprising promote candidates of the second ordered list that are an exact match, or that have a prefix that is an exact match, with the composing text of the second user attempt.

4. The computing device of claim 2, further comprising computer-executable instructions that, when executed by the processor, cause the computing device to perform operations comprising preserve the order of the one or more candidates from the first ordered list and to preserve the order of the one or more candidates from the second ordered list when generating the third ordered list.

5. The computing device of claim 2, wherein the data indicative of the second user attempt comprises composing text of the second user attempt, further comprising computer-executable instructions that, when executed by the processor, cause the computing device to perform operations comprising:
   filter the first ordered list of candidates to identify matching and non-matching candidates of the first ordered, wherein at least part of each matching candidate meets a threshold similarity with the composing text of the second user attempt, and wherein at least part of each non-matching candidate fails to meet the threshold similarity with the composing text of the second user attempt;
   include the matching candidates in the third ordered list; and
   rank the matching candidates higher than the one or more candidates from the second ordered list of candidates in the third ordered list.

6. The computing device of claim 5, wherein each matching candidate comprises the composing text of the second user attempt.

7. The computing device of claim 5, further comprising computer-executable instructions that, when executed by the processor, cause the computing device to perform operations comprising:
   include the non-matching candidates in the third ordered list; and
   rank the non-matching candidates lower than the one or more candidates from the second ordered list of candidates in the third ordered list.

8. The computing device of claim 7, wherein each non-matching candidate does not comprise the composing text of the second user attempt.

9. The computing device of claim 2, further comprising computer-executable instructions that, when executed by the processor, cause the computing device to perform operations comprising:
   automatically correct the second user attempt by replacing the composing text of the second user attempt to a highest ranking candidate of the third ordered list in response to a spacebar user input or in response to one of a plurality of predetermined punctuation user inputs.

10. The computing device of claim 2, further comprising computer-executable instructions that, when executed by the processor, cause the computing device to perform operations comprising display a plurality of highest ranking candidates of the third ordered list for user selection.

11. The computing device of claim 1, further comprising computer-executable instructions that, when executed by the processor, cause the computing device to perform operations comprising:

receive further data indicative of the second user attempt; and repeat the combining to incorporate the further data.

12. A method performed by a computing device for predicting text, the method comprising:

receiving, by the computing device, data indicative of a first user attempt at inputting text;

providing an autocorrect to the first user attempt;

receiving a user input deleting at least one character of the autocorrect;

receiving, by the computing device, data indicative of a second user attempt at inputting the text, wherein the second user attempt occurs after receiving the user input deleting e at least one character;

combining, by the computing device, the data indicative of the first user attempt at inputting the text and the data indicative of the second user attempt at inputting the text to predict the text; and outputting the prediction for display.

13. The method of claim 12, wherein the combining comprises:

generating a first ordered list of candidates using the data indicative of the first user attempt at inputting the text;

generating a second ordered list of candidates using the data indicative of the second user attempt at inputting the text; and generating a third ordered list of candidates comprising one or more candidates from the first ordered list of candidates and one or more candidates from the second ordered list of candidates.

14. The method of claim 13, wherein the data indicative of the second user attempt comprises composing text of the second user attempt, and generating the third ordered list comprises:

filtering the first ordered list of candidates to identify matching and non-matching candidates of the first ordered list of candidates, wherein at least part of each matching candidate meets a threshold similarity with the composing text of the second user attempt, and wherein at least part of each non-matching candidate fails to meet the threshold similarity with the composing text of the second user attempt;

including the matching candidates in the third ordered list; and ranking the matching candidates higher than the one or more candidates from the second ordered list of candidates in the third ordered list.

15. The method of claim 14, wherein generating the third ordered list comprises:

including the non-matching candidates in the third ordered list; and ranking the non-matching candidates lower than the one or more candidates from the second ordered list of candidates in the third ordered list.

16. The method of claim 13, further comprising:

automatically correcting the second user attempt by replacing the composing text of the second user attempt with a highest ranking candidate of the third ordered list in response to a spacebar user input or in response to one of a plurality of predetermined punctuation user inputs.

17. The method of claim 13, further comprising displaying a plurality of highest ranking candidates of the third ordered list for user selection.

18. The method of claim 12, further comprising:

receiving further data indicative of the second user attempt; and repeating the combining to incorporate the further data.

19. A system for predicting text, the system comprising:

a user interface configured for:

receiving data indicative of a first user attempt at inputting text and providing an autocorrect to the first user attempt;

receiving a user input deleting at least one character of the autocorrect;

receiving data indicative of a second user attempt at inputting the text, wherein the second user attempt occurs after receiving the user input deleting the at least one character;

combining the data indicative of the first user attempt at inputting the text and the data indicative of the second user attempt at inputting the text to predict the text; and outputting the prediction for display.

20. The system of claim 19, wherein the user interface is further configured for:

generating a first ordered list of candidates using the data indicative of the first user attempt at inputting the text;

generating a second ordered list of candidates using the data indicative of the second user attempt at inputting the text; and generating a third ordered list of candidates comprising one or more candidates from the first ordered list of candidates and one or more candidates from the second ordered list of candidates.

* * * * *